US012800096B2

(12) United States Patent
Alfakhrany et al.

(10) Patent No.: US 12,800,096 B2
(45) Date of Patent: Nov. 17, 2026

(54) MOUNTING BRACKET ASSEMBLY

(71) Applicant: Rhino Rack Australia Pty Limited, Eastern Creek (AU)

(72) Inventors: Tarek Alfakhrany, Eastern Creek (AU); Adam Connellan, Sydney (AU)

( * ) Notice: Subject to any disclaimer, the term of this patent is extended or adjusted under 35 U.S.C. 154(b) by 178 days.

(21) Appl. No.: 18/282,741

(22) PCT Filed: Mar. 19, 2022

(86) PCT No.: PCT/AU2022/050250

§ 371 (c)(1),
(2) Date: Sep. 18, 2023

(87) PCT Pub. No.: WO2022/192968

PCT Pub. Date: Sep. 22, 2022

(65) Prior Publication Data

US 2024/0093831 A1 Mar. 21, 2024

(30) Foreign Application Priority Data

Mar. 19, 2021 (AU) ................................ 2021900810

(51) Int. Cl.

| | |
|---|---|
| ***F16M 13/02*** | (2006.01) |
| ***B60R 9/048*** | (2006.01) |
| ***B60R 9/058*** | (2006.01) |
| *B60R 11/00* | (2006.01) |

(52) U.S. Cl.
CPC ........... *F16M 13/022* (2013.01); *B60R 9/048* (2013.01); *B60R 9/058* (2013.01); *B60R 2011/0078* (2013.01)

(58) Field of Classification Search
CPC ........ F16M 13/022; B60R 9/048; B60R 9/058
USPC .......................................... 249/200; 248/200
See application file for complete search history.

(56) References Cited

U.S. PATENT DOCUMENTS 4,088,250 A * 5/1978 Schaefer .................. A45F 5/00 224/558
2005/0224539 A1* 10/2005 Hardy .................... B60R 11/00 224/547
2007/0256341 A1 11/2007 McLaughlin
2008/0029563 A1* 2/2008 Malone .................... B60R 9/00 224/319

FOREIGN PATENT DOCUMENTS

| | | | |
|---|---|---|---|
| CN | 201347159 | 11/2009 | |
| DE | 202011108928 U1 | 3/2013 | |
| JP | H0556839 A | 3/1993 | |
| JP | H08142767 A | 6/1996 | |
| WO | WO-2020243780 A1 * | 12/2020 | ............ B60R 9/058 |

* cited by examiner

*Primary Examiner* — Todd M Epps
(74) *Attorney, Agent, or Firm* — Kritzer McPhee LLP

(57) ABSTRACT

The present invention relates to a mounting bracket assembly for mounting an article to a mounting site, comprising a bracket base that includes at least a mounting structure that is configured to affix to the mounting site, and a receiving structure and a bracket adaptor that includes at least an engaging structure complementary to the receiving structure of the bracket base, wherein the bracket adaptor is mounted to the bracket base by being oriented in an engaging orientation relative to an orientation of the bracket base and linearly sliding the engaging structure in a first direction and into engagement with the receiving structure.

17 Claims, 11 Drawing Sheets

MOUNTING BRACKET ASSEMBLY

PRIORITY DETAILS

The present application claims priority from International Application No. PCT/AU2022/050250, filed on Mar. 19, 2022, which claims priority from Australian Application No. AU 2021900810, filed in Australia on Mar. 19, 2021, the entirety of which are incorporated herein by reference.

TECHNICAL FIELD

The present invention relates generally to the field of vehicle accessories, and more particularly to means of mounting vehicle accessories to a rooftop cargo carrier.

BACKGROUND

Mounting brackets are a means of affixing a range of articles to various mounting sites. One particular style of mounting bracket assembly is intended to provide the ability to rapidly mount and dismount the article from the mounting site, so as to provide adaptability. However, prior art mounting bracket assemblies often suffer from drawbacks such as 'binding' occurring between the fixed component and the demountable component, inhibiting the ability of a user to 'swap out' articles. Others have complex mounting means or require that the demountable component (typically with the article attached) to be precisely positioned to ensure that the components properly engage with one another. This is difficult if the article is particularly large, unwieldy or heavy.

It would therefore be advantageous to provide a 'universal' system that enables accessories to be easily and rapidly mounted to and dismounted from rooftop cargo carriers, while addressing the deficiencies of the prior art such as the tendency for fouling or binding to occur between the fixed and demountable components, and/or to promote ease of mounting the demountable component to the fixed component by reducing the need for precision manoeuvring.

It would be further advantageous of providing a generic mounting point upon a rooftop cargo carrier to which a plurality of different accessories may be mounted, enabling a user to adapt their vehicle's loadout depending upon their current needs.

DISCLOSURE OF THE INVENTION

In a first aspect, the present invention relates to a mounting bracket assembly for mounting an article to a mounting site, comprising a bracket base that includes at least a mounting structure that is configured to affix to the mounting site, and a receiving structure and a bracket adaptor that includes at least an engaging structure complementary to the receiving structure of the the bracket base, wherein the bracket adaptor is mounted to the bracket base by being oriented in an engaging orientation relative to an orientation of the bracket base and linearly sliding the engaging structure in a first direction and into engagement with the receiving structure.

In an embodiment the receiving structure comprises at least one guiding face that is arranged to extend at an acute angle to the first direction, the engaging structure comprises at least one complementary face that extends parallel and complementary to the at least one guiding face of the receiving structure, and upon the engaging structure linearly sliding into engagement with the receiving structure, the at least one guiding face and at least one complementary face are adjacent to and contacting one another.

In an embodiment the receiving structure comprises a guide rail extending in the first direction for a portion of a length thereof, and the engaging structure comprises a rail-receiving portion adapted to linearly slide proximal to the guide rail.

In an embodiment the at least one guiding face is an outwardly-directed face of the guide rail and the at least one complementary face is an inwardly-directed face of the rail-receiving portion.

In an embodiment one of the guide rail and the rail-receiving portion comprises a secondary guide protrusion extending therefrom and having a length substantially parallel to the first direction, and the other of the rail-receiving portion and the guide rail comprises a secondary slot adapted to receive the secondary guide protrusion therein.

In an embodiment at least one outwardly-directed face of the secondary guide protrusion provides the at least one guiding face, and at least one inwardly-directed face of the secondary slot provides the at least one complementary face.

In an embodiment the receiving structure comprises a slide stop having at least one flange extending from the slide stop and arranged to form a slot, and the engaging structure comprises a tab extending from the engaging element and arranged to, when the bracket adaptor is oriented in the engaging orientation, extend in the first direction and be received by the slot when the engaging structure linearly slides into engagement with the receiving structure, In a further embodiment the at least one guiding face is a face of the at least one flange adjacent to the formed tab slot and the at least one complementary face is a face of the tab that is received by the slot.

In an embodiment the receiving structure further comprises a directional face extending substantially parallel to the first direction, and the engaging structure further comprises a sliding face that extends substantially parallel to the first direction when the bracket adaptor is oriented in the engaging orientation.

In an embodiment the receiving structure comprises a further guide rail arranged alongside and spaced from the guide rail and extending substantially parallel thereto, and the rail-receiving portion of the engaging structure is adapted to receive and linearly slide proximal to both the guide rail and the further guide rail, such that upon the engaging structure linearly sliding into engagement with the receiving structure, a cavity is formed within the space between the guide rail and further guide rail.

In an embodiment the mounting bracket assembly further comprises a first aperture extending through the bracket adaptor and a second aperture extending through the bracket base, wherein the first and second apertures are each adapted to receive a threaded fastener therethrough, and upon the engaging structure linearly sliding into engagement with the receiving structure, the first and second apertures align with one another.

A further embodiment of the preset invention may lie in a mounting bracket assembly kit, comprising at least one bracket base of any one of the above embodiments, a first bracket adaptor of any one of the above embodiments, the first bracket adaptor further comprising an article affixing means adapted to enable a first article type to be affixed thereto, and a second bracket adaptor of any one of the above embodiments, the second bracket adaptor further comprising an article affixing means adapted to enable a second article type to be affixed thereto, wherein the first article type and second article type are different article types.

Further embodiments may be disclosed herein. These and other embodiments that may become clear to the person skilled in the art upon reading the disclosure contained herein are considered to fall within the scope of the present invention.

DESCRIPTION OF FIGURES

Embodiments of the present invention will now be described in relation to figures, wherein.

DETAILED DESCRIPTION OF PREFERRED EMBODIMENTS

Figure 1A:
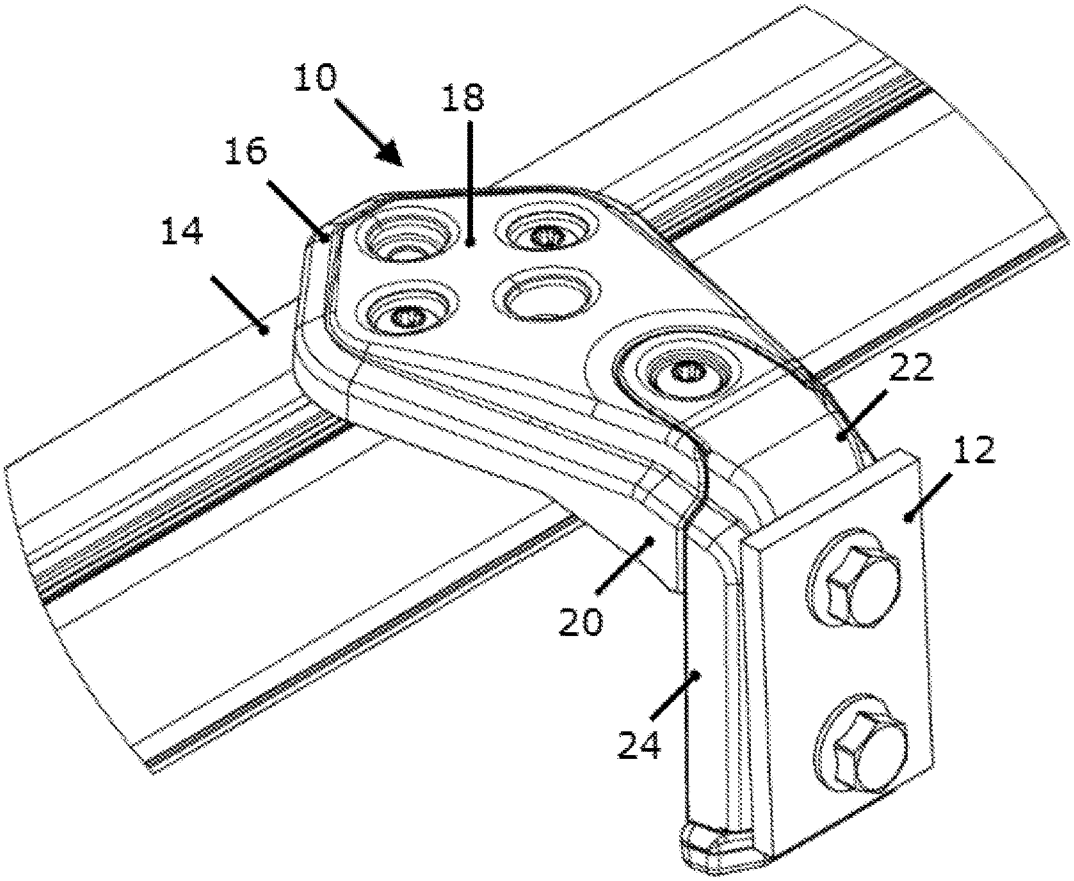
FIGS. 1A & 1B depict an embodiment of the present invention 'in use' and mounted to an example mounting site.
Figure 1B:
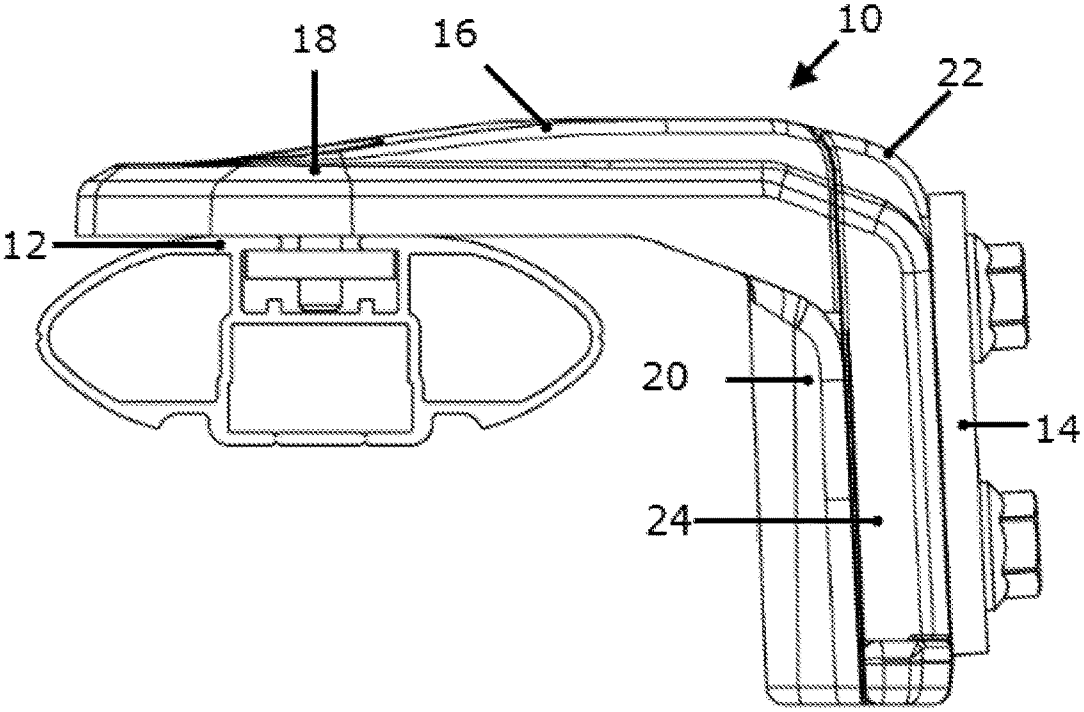

In a first aspect, the present invention relates to a means of mounting an article to a mounting site, such as mounting an accessory to a vehicle. In an embodiment and with reference to FIGS. 1A & 1B, the present invention may comprise a mounting bracket assembly 10 for mounting an article 12 to a mounting site 14, comprising a bracket base 16 that includes at least a mounting structure 18 that is configured to affix to the mounting site 14 and a receiving structure 20, and a bracket adaptor 22 that includes at least an engaging structure 24 complementary to the receiving structure 20 of the bracket base 16. The skilled person will appreciate that the mounting site 14 depicted in FIGS. 1A & 1B are to be interpreted as representative of a generic mounting site, and that the invention is not to be construed as limited to being mountable to a particular type of mounting site.

Figure 2:
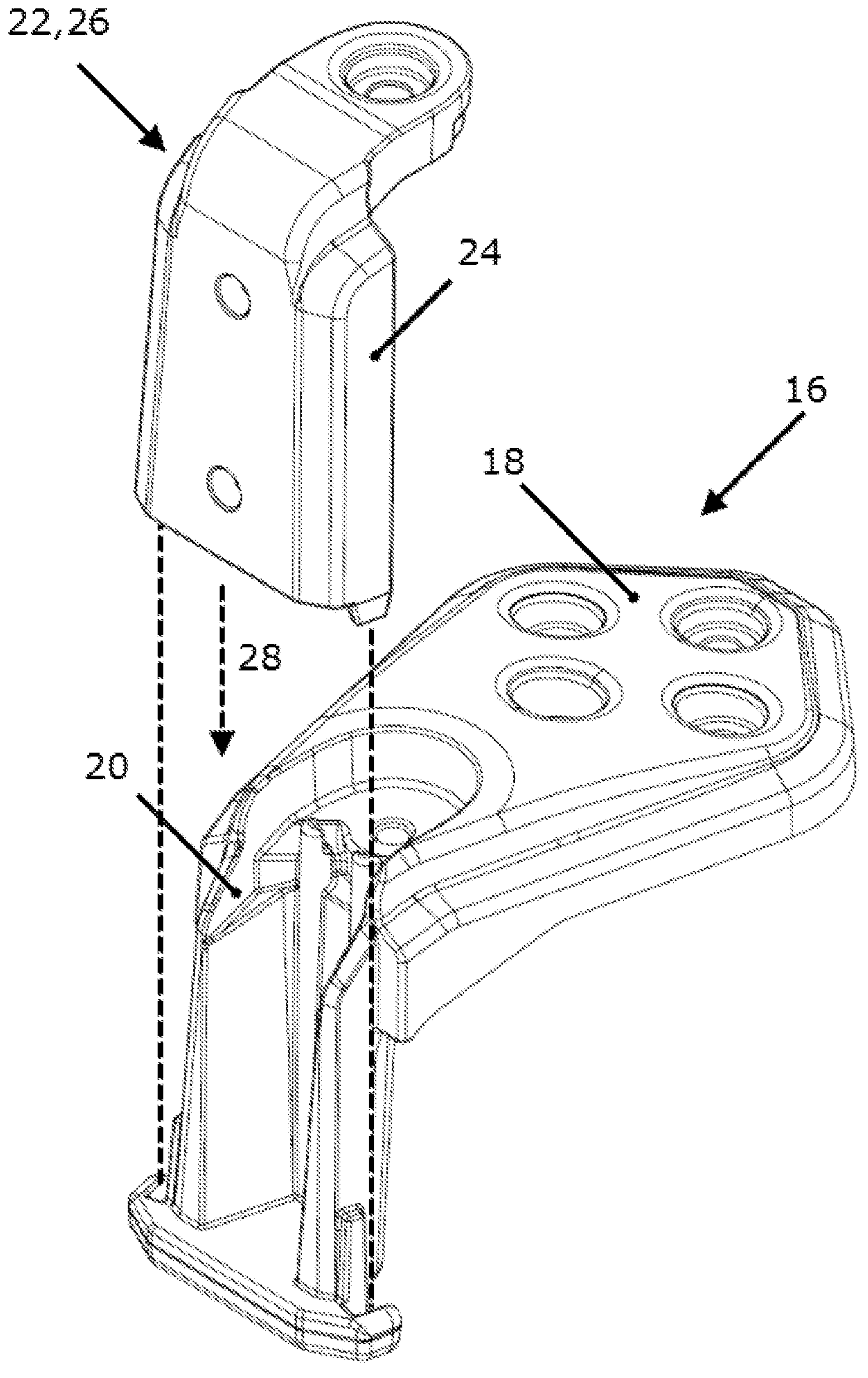
FIG. 2 depicts the mounting process of an embodiment of the present invention.

In an embodiment and with reference to FIG. 2, the bracket adaptor 22 may be adapted to be mounted to the bracket base 16 by being oriented in an engaging orientation 26 relative to an orientation of the bracket base 16 and linearly sliding the engaging structure 24 in a first direction 28 and into engagement with the receiving structure 20. In an embodiment, the engaging orientation 26 does not change during the engaging process, i.e. neither the bracket adaptor 22 or bracket base needs to be rotated away from the engaging orientation 26 to fully engage the two components.

Figure 3A:
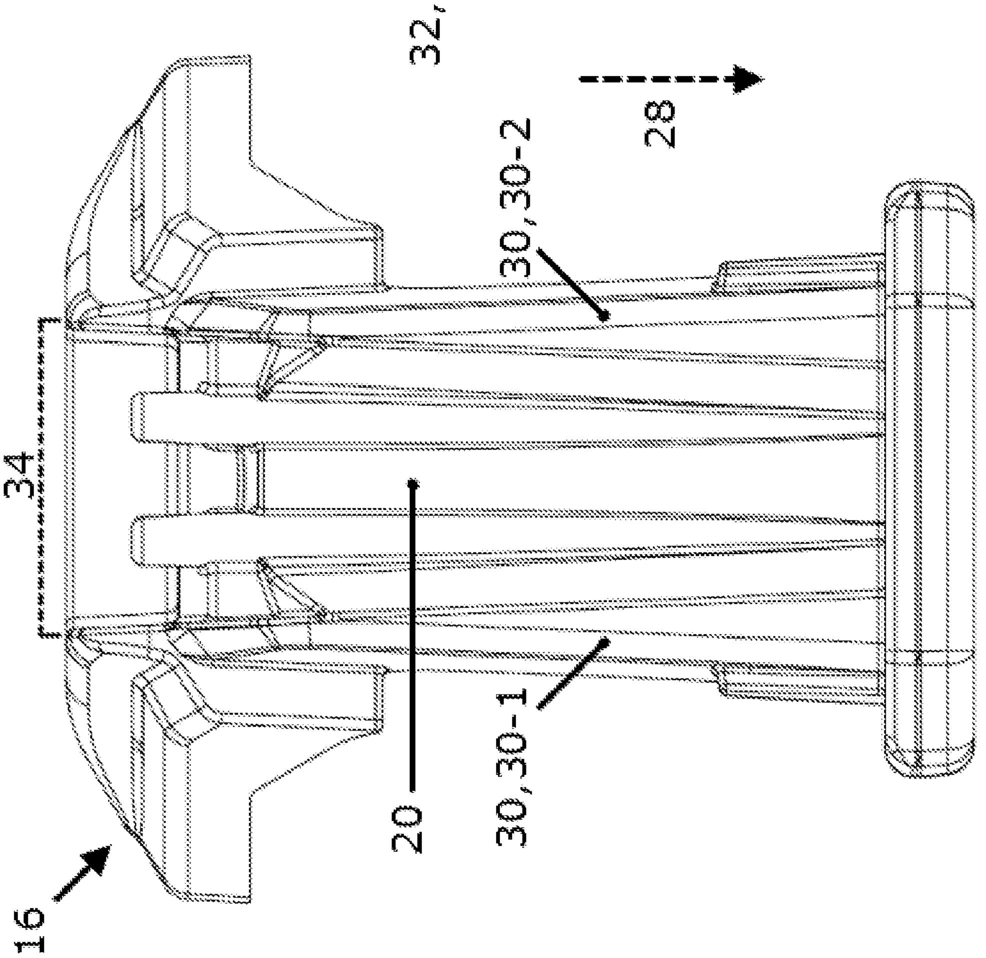
FIGS. 3A, 3B, 4A & 4B depict various embodiments of the invention having guiding means.
Figure 3B:
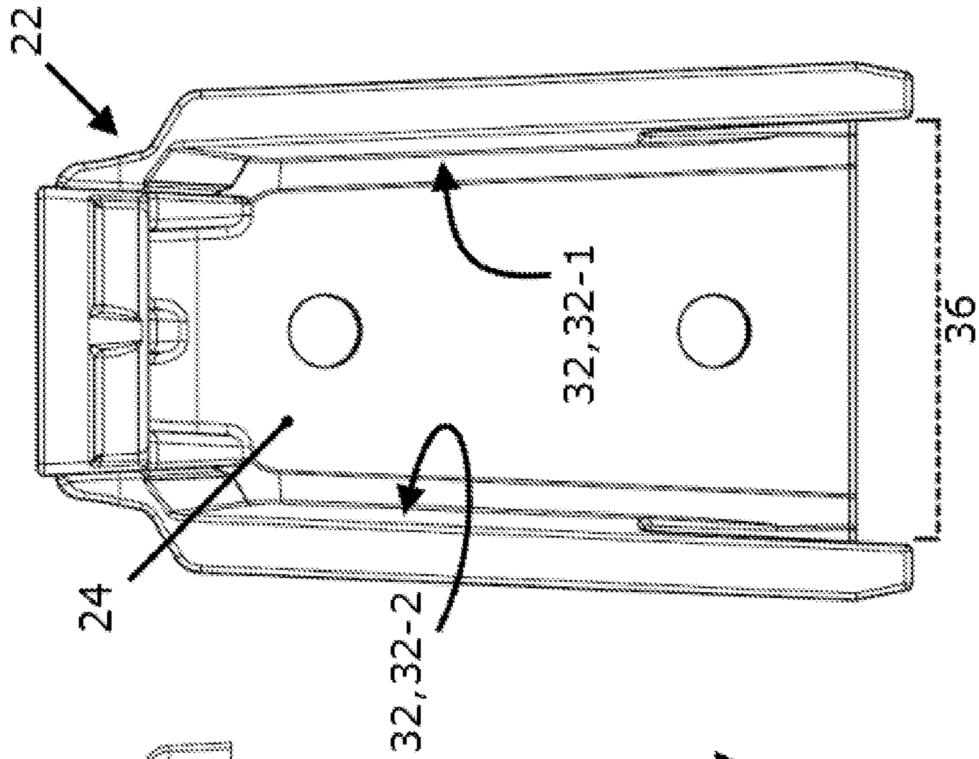

In an embodiment and with reference to FIGS. 3A & 3B, the receiving structure 20 may comprise at least one guiding face 30 that is arranged to extend at an acute angle to the first direction 28. In such an embodiment, the engaging structure 24 may comprise at least one complementary face 32 that extends substantially parallel and complementary to the at least one guiding face 30 of the receiving structure 20. Upon the engaging structure 24 linearly sliding into engagement with the receiving structure 20, the at least one guiding face 30 and at least one complementary face 32 may be adjacent to and contacting one another.

Without limiting the scope of the invention through theory, it is considered that incorporating guiding faces that are not parallel with the direction of insertion of the bracket adaptor 22 into the bracket base 16 (i.e. the first direction 28), the function of a demountable bracket assembly 10 may be improved. For example, as the guiding face 30 and complementary face 32 are not parallel to the first direction 28, neither mounting and dismounting of the bracket adaptor 22 to or from the bracket base 16 require that the complementary face 32 slides along the guiding face 30. This may mean that there is no, or significantly reduced, interfacial friction between the guiding and complementary faces 32-1, 32-2. This may ameliorate, negate or otherwise negate the occurrence of 'binding' between the bracket base 16 and bracket adaptor 22 that may otherwise impact upon a user's ability to mount or dismount the aforementioned components to or from one another.

A further advantage that a non-parallel guiding face 30 and matching complementary face 32 may provide is improved ease in aligning the bracket base and adaptor 16,22 with one another. With further reference to FIGS. 3A & 3B, the bracket adaptor 22 is mounted to the bracket base 16 by positioning the first end 36 of the engaging structure 24 proximal to the first end 34 of the receiving structure 20, with the bracket adaptor 22 in the engaging orientation 26, and linearly sliding the engaging structure 24 in the first direction 28. As a result of the acute angle of the guiding face 30 relative to the first direction 28, the first end 34 of the receiving structure 20 may have a narrower width than the first end 36 of the engaging structure 24. As the skilled person may appreciate, this may provide some leeway in the relative lateral positioning of the bracket base and adaptor 16,22 in that they do not need to be perfectly laterally aligned at the beginning of the engagement process. Upon linearly sliding the engaging structure 24 into engagement with the receiving structure 20, the guiding face 30 having an acute angle will urge the bracket adaptor in a lateral direction (by the complementary face 32 and guiding face 30 sliding along one another), therefore bringing the bracket base and adaptor 16,22 towards lateral alignment. This may be of particular benefit when a large, heavy or unwieldy article 12 is being mounted to a mounting site 14, and so precisely aligning the bracket base and adaptor 16,22 is more difficult.

In some embodiments, and as depicted in FIGS. 3A & 3B, the receiving structure 20 may comprise paired guiding faces 30-1,30-2 and the engaging structure may comprise paired complementary faces 32-1,32-2. This may further enhance the aforementioned advantages. However, the skilled person will appreciate that the aforementioned advantages are still achievable with a single guiding face 30 and complementary face 32.

Figure 4B:
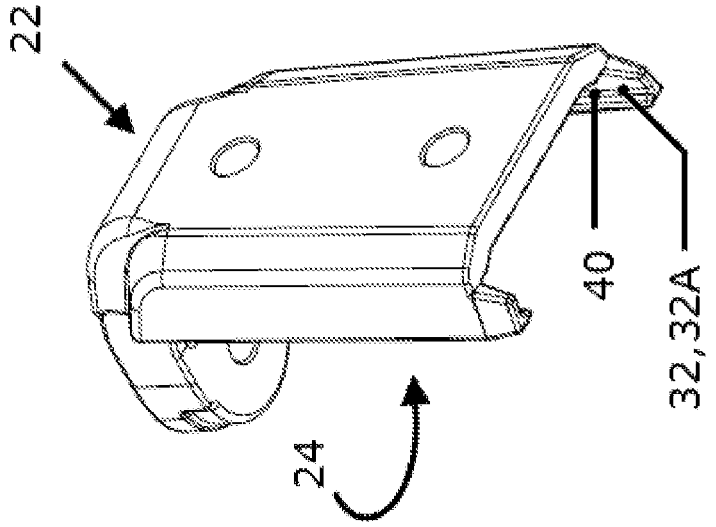
Figure 4A:
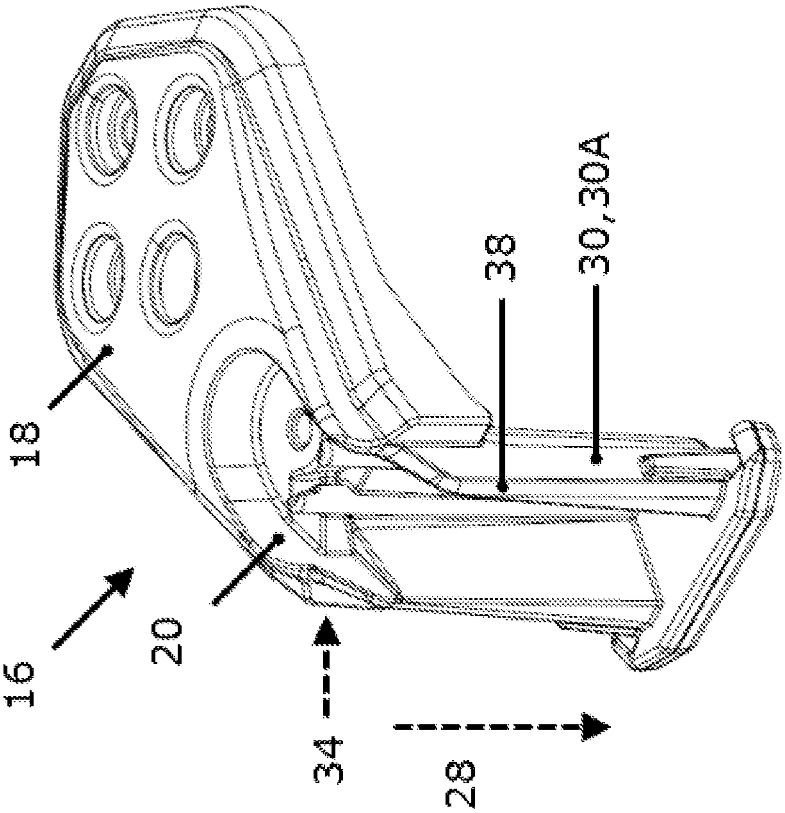

In an embodiment and with reference to FIGS. 4A & 4B, the receiving structure 20 may comprise a guide rail 38 that is extending substantially parallel to in the first direction 28 for at least a portion of a length thereof, and the engaging structure 24 may comprise a rail-receiving portion 40 that is adapted to be able to linearly slide proximal to the guide rail 38. The guide rail 38 may provide a means of guiding the engaging structure 24 into the correct position by the rail-receiving portion 40 sliding therealong.

As used herein, "substantially extending" is not to be interpreted to mean that the guide rail 38 must be exactly parallel with the first direction 28.

In a further embodiment, the guiding face 30 may be a face 30A of the guide rail 38, and the complementary face 32 may be a face 32A of the rail-receiving portion 40 that is arranged to be complementary to the rail guiding face 30A. In such an embodiment, the guide rail 38 may be arranged at an acute angle relative to the first direction 28 so as to provide the guiding face 30A. Alternatively, the guide rail 38 may gradually thicken along its length, such that although it may be overall substantially parallel to the first direction 28, at least one face is at an acute angle relative thereto and therefore provides the guiding face 30A. Either of the aforementioned arrangements of the guide rail 38 are considered to be extending substantially parallel with the first direction for the purpose of the invention. The skilled person will appreciate that there may be other methods of providing a guide rail that serves to guide the engaging structure 24 into its correct position (such as the fully-engaged form of the bracket assembly 10 as depicted in FIGS. 1A & 1B) while also providing a guiding face 30A that is at an acute angle relative to the first direction 28, and that some or all of these methods may be utilised without departing from the scope or object of the invention.

Figure 5:
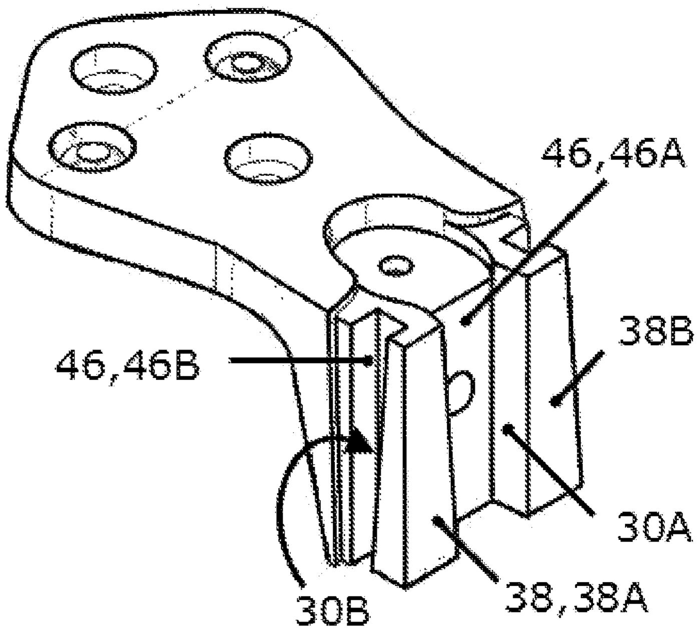
FIG. 5 depicts an alternate embodiment of the bracket base of the present invention.

FIG. 4A depicts the guiding face 30A as being an outwardly-directed face of the guide rail 38 and FIG. 4B depicts the complementary face 32A being an inwardly-directed face of the rail-receiving portion 40, however the skilled person will appreciate that this arrangement is an example only. For example, the opposite arrangement may also fall within the scope of the invention. With reference to FIG. 5 which depicts an alternate embodiment of the bracket base 16, the guide rail 38 may be adapted to form a slot 46 extending for the length thereof, such as by providing a further guide rail 38B, as depicted by the slot 46A. Alternatively, the slot 46 may be cut, carved or formed into the guide rail, as depicted by the slot 46B. The rail-receiving portion (not shown) may comprise a prong shaped to linearly slide into the slot formed by the guide rail or rails. In such an embodiment, the guiding face 30A may be an inwardly-directed face of one or both of the guide rails, and the complementary face 32A may be an outwardly-directed face of the prong (not shown).

Figure 6B:
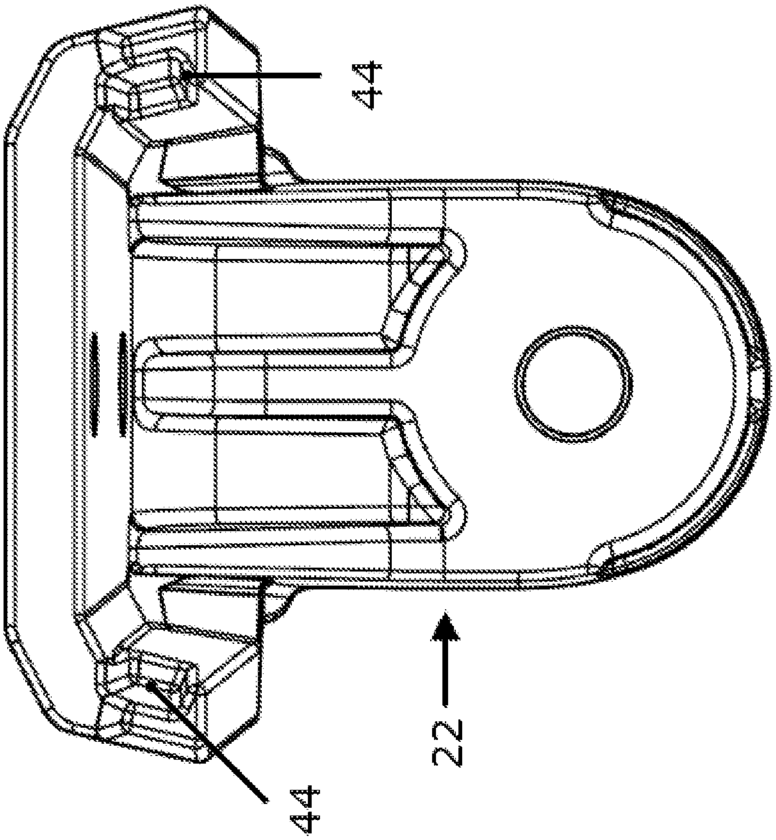
FIGS. 6A, 6B, 7 and Insets A & B depict further embodiments of the invention having guiding means.
Figure 6A:
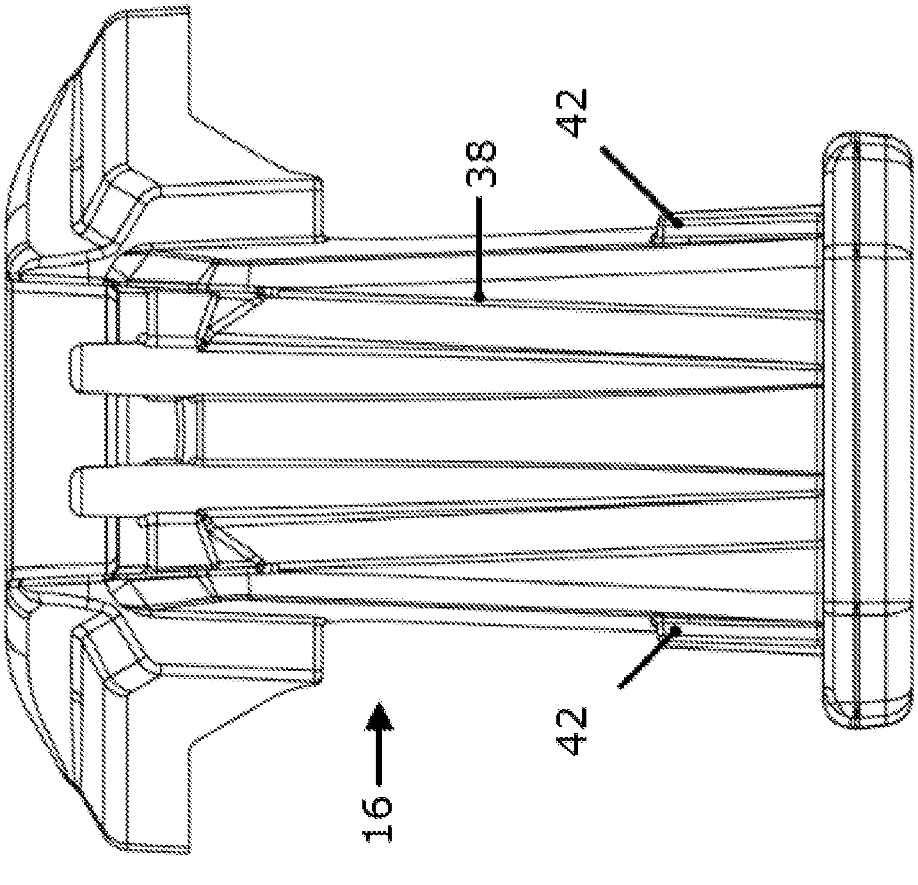

In an embodiment and with reference to FIGS. 6A & 6B, the guide rail may comprise a secondary guide protrusion 42 extending therefrom and having a length substantially parallel to the first direction 28. The rail-receiving portion 40 of the engaging structure 24 may comprise a secondary slot 44 adapted to receive the secondary guide protrusion 42 therein. The secondary guide protrusion 42 and secondary slot 44 may provide additional guidance to promote the engaging structure 24 linearly sliding in the first direction 28, such that the bracket adaptor 22 will correctly engage with the bracket base 16. Furthermore, while the guide rail 38 may provide guidance to prevent the bracket adaptor 22 misaligning by drifting laterally, the secondary guide protrusion 42 may inhibit the bracket adaptor 22 from moving directly away from the bracket base 16.

Figure 7:
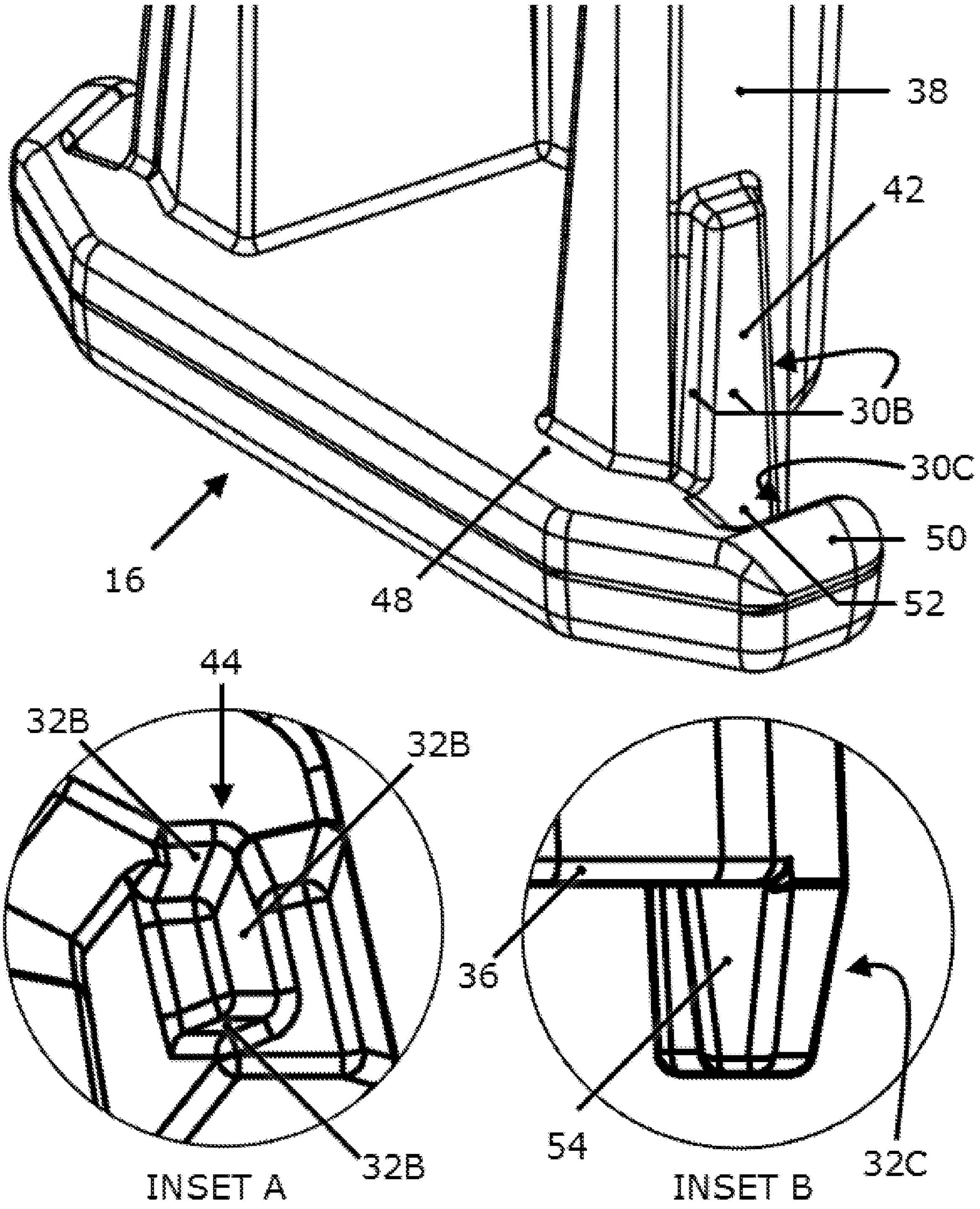

In a further embodiment, and with reference to FIG. 7 and Inset A (being an end-on view of the bracket adaptor 22 depicting the secondary slot 44), the guiding face 30 may be a face 30B of the secondary guide protrusion, with the complementary face 32 being a face 32B of the secondary slot 44. This may be in addition to, or instead of, a face of the guide rail providing a first guiding face 30A.

The skilled person will appreciate that although the above embodiment describes the 'protrusion' as being upon the guide rail 38 and the 'slot' being within the rail-receiving portion, as above, simply reversing these two elements does not depart from the scope of the invention and the bracket assembly may utilise the opposite arrangement to achieve a mechanically similar advantage. With return reference to FIG. 5, in an alternate embodiment the guide rail 38 may comprise a secondary guide slot 46B, while the rail-receiving portion 40 may comprise a secondary protrusion (not shown) that engages therewith. In such an embodiment, the guiding face 30B may be a face of the secondary guide slot 46B and the complementary face 32B may be a face of the secondary protrusion.

In an embodiment and with further reference to FIG. 7 and with reference to Inset B depicting the first end of the bracket adaptor 22, the receiving structure 20 may comprise a slide stop 52 arranged to receive the first end 36 of the engaging structure and stop the linear sliding thereof at the appropriate position. In a further embodiment, the slide stop may comprise at least one flange 54 extending therefrom, the flange being arranged to form a tab slot 56. In such an embodiment, the engaging structure 24 may comprise a tab 58 arranged to, when the bracket adaptor 22 is oriented in the engaging orientation 26, extend in the first direction 28 and be received by the tab slot 56 when the engaging structure 24 linearly slides into engagement with the receiving structure 20. In a further embodiment, at least one face of the flange 54 facing into the formed tab slot 56 provides the at least one guiding face 30C, and the at least one complementary face 32 is a face 32C of the tab 58 that is received by the tab slot 56. This may be in addition to, or instead of, the provision of a guiding face 30A by a guide rail 38 and/or a guiding face 30B by a secondary protrusion 42 or secondary slot 44.

Figure 8B:
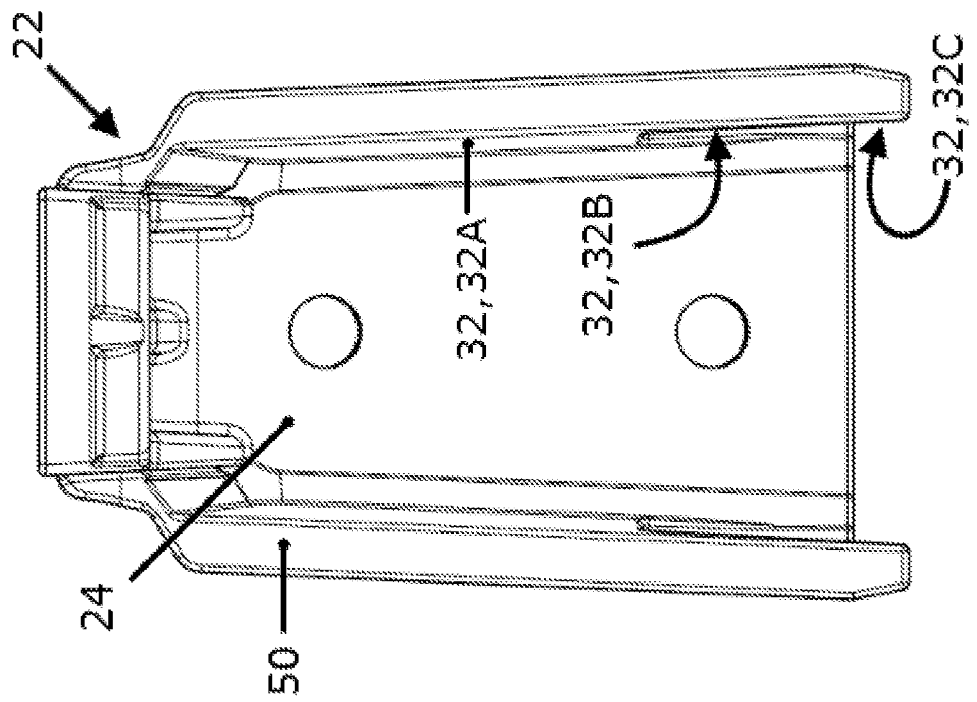
FIGS. 8A & 8B depict embodiments of the invention comprising directing means.
Figure 8A:
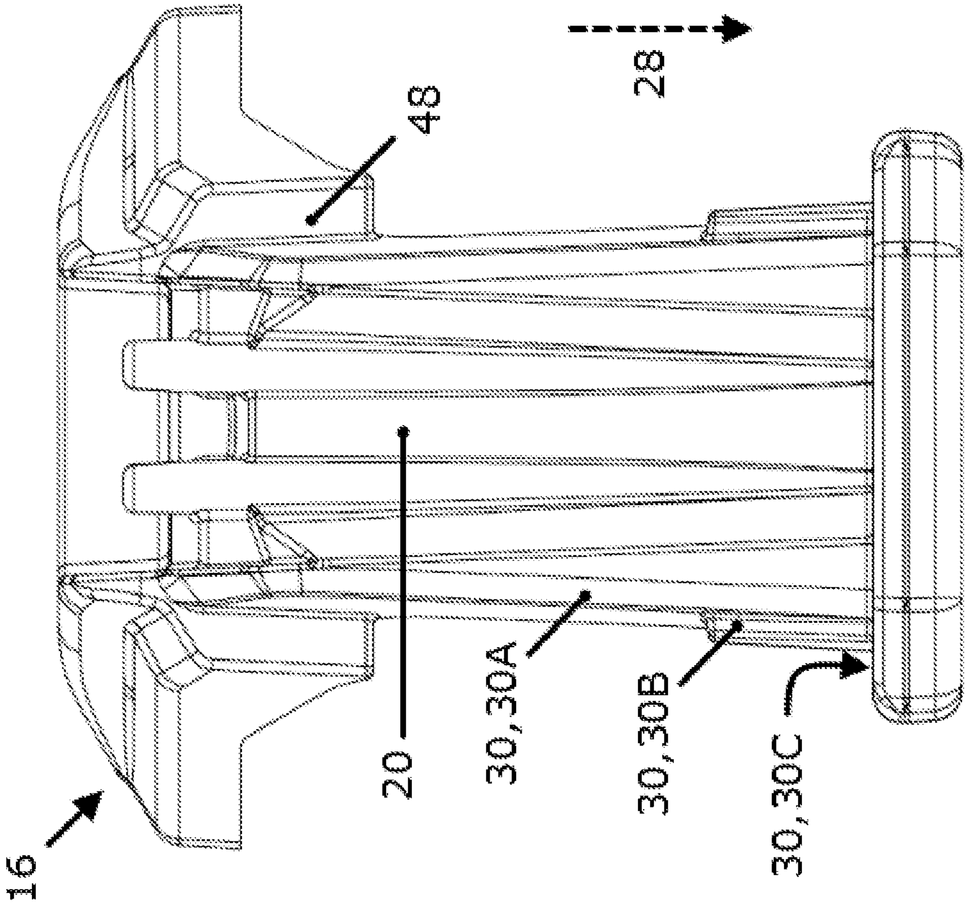

In an embodiment and with reference to FIGS. 8A & 8B, the receiving structure 20 may comprise a range of different guiding faces 30A-C, and the engaging structure 24 may comprise matching complementary faces 32A-C. The engaging structure 20 may comprise any one of guiding faces 30A-C, any two, all three guiding faces 30A-C or even additional guiding faces 30 that are arranged to extend at an acute angle relative to the first direction 28, beyond those depicted in the previously-described embodiments. The receiving structure 24 may have the appropriately matching complementary faces 32.

In an embodiment, the receiving structure 20 may comprise a directional face 48 that is substantially parallel to the first direction 28, and the engaging structure 24 may comprise a sliding face 50 that is also substantially parallel to the first direction 28 when the bracket adaptor 22 is oriented in the engaging orientation 26. In a further embodiment the sliding face 50 is arranged to substantially linearly slide along the directional face 48. The directional face 48 and/or the sliding face 50 may provide a means of defining the first direction 28 and/or the engaging orientation 26

Figure 9A:
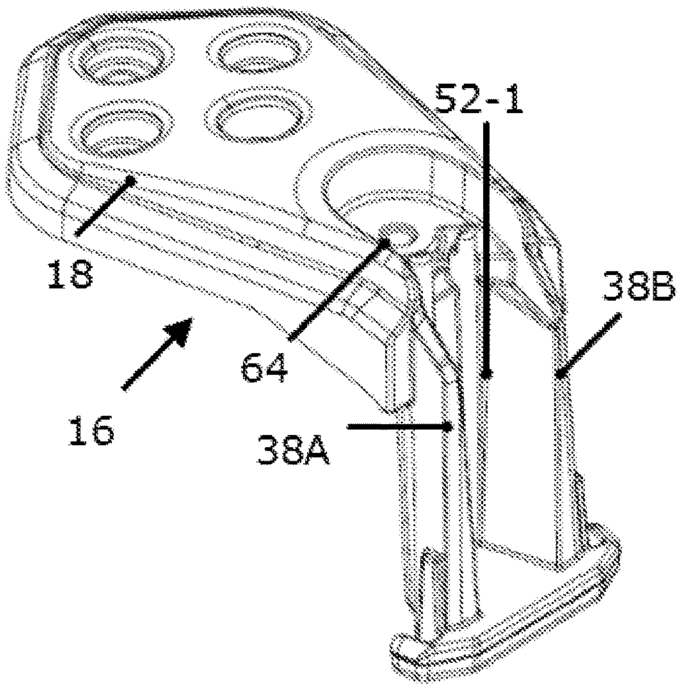
FIGS. 9A-9C depict an embodiment of the invention having an internal cavity.
Figure 9B:
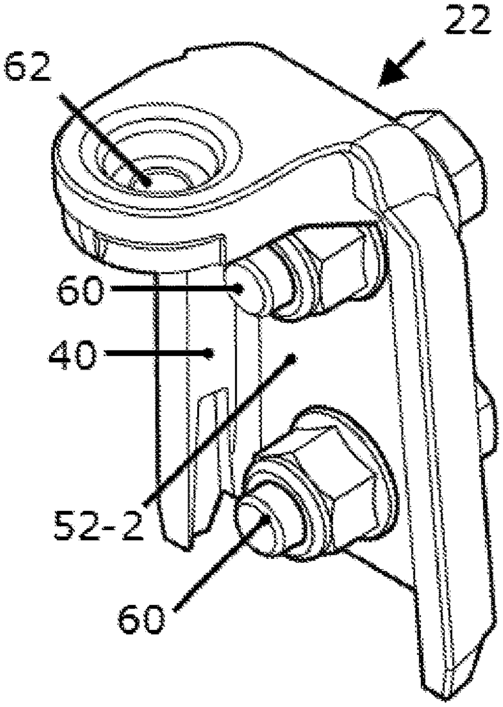
Figure 9C:
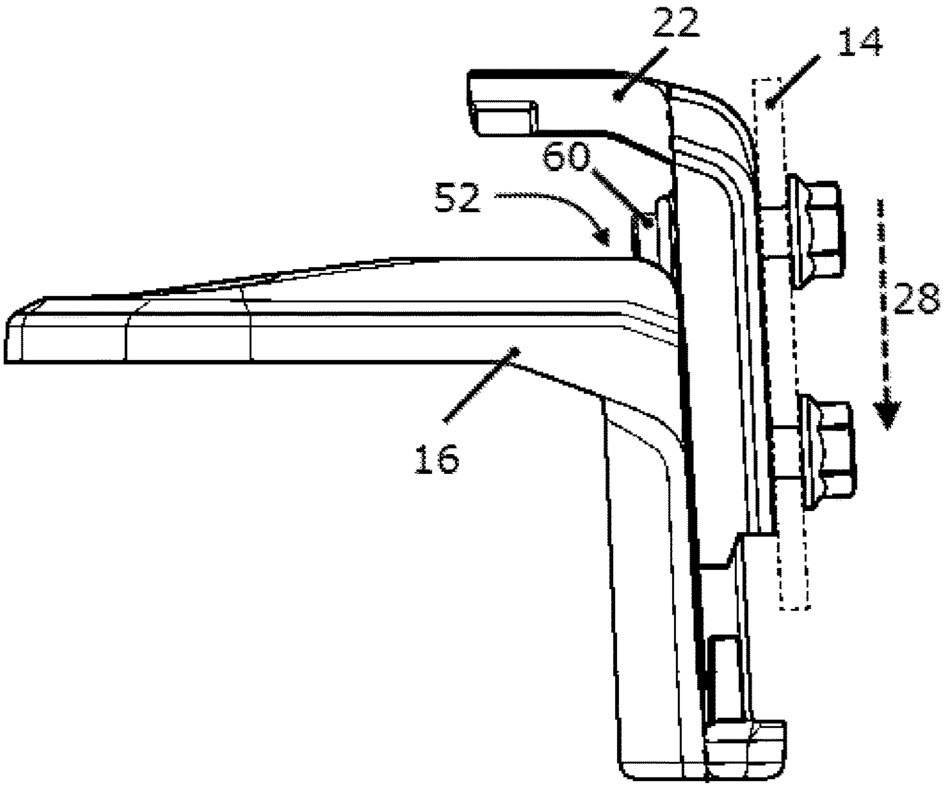

In an embodiment wherein the receiving structure 20 comprises a guide rail 38,38A, it may comprise a further guide rail 38B arranged alongside and spaced from the guide rail 38A and extending substantially parallel thereto. In such an embodiment, the rail-receiving portion 40 of the engaging structure may be shaped, configured or otherwise adapted to receive and linearly slide proximal to both the guide rail 38A and the further guide rail 38B such that a cavity is formed within the space between the guide rail and further guide rail. With reference to FIGS. 9A-9C, depicted is an embodiment of a bracket base 16 having a receiving structure 20 comprising a guide rail 38A and further guide rail 38B, with a first cavity portion 52-1 therebetween. Also depicted is an embodiment of a bracket adaptor 22 having an engaging structure 24 comprising a rail-receiving portion 40 adapted to receive both of the guide rails 38A,38B and having a second cavity portion 52-2 therein. Also shown are the ends of a pair of threaded fasteners 60 affixing an article 14 to a face of the bracket adaptor 22. With particular reference to FIG. 9C, as the bracket adaptor 22 linearly slides in the first direction 28, the first and second cavity portions 52-1,52-2 align to form the cavity 52.

In an embodiment and with further reference to FIGS. 9A & 9B, the mounting bracket assembly 10 may further comprise a first aperture 62 extending through the bracket adaptor 22 and a second aperture 64 extending through the bracket base 16. The first and second apertures 62,64 may be each adapted to receive a threaded fastener therethrough, and may be further adapted to align with one another upon the engaging structure 24 linearly sliding into engagement with the receiving structure 20. The mounting bracket assembly 10 may be fastened together by a threaded fastener passing through the aligned first and second apertures 62,64. In a further embodiment, the first and second apertures 62,64 align with one another in the first direction 28.

Figure 10A:
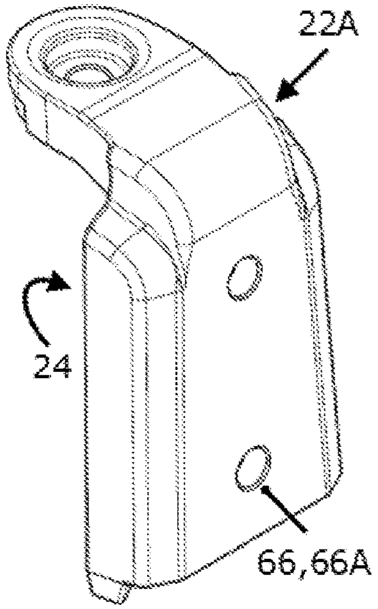
FIGS. 10A-10C depict various embodiments of the bracket adaptor of the present invention having various article affixing means.
Figure 10B:
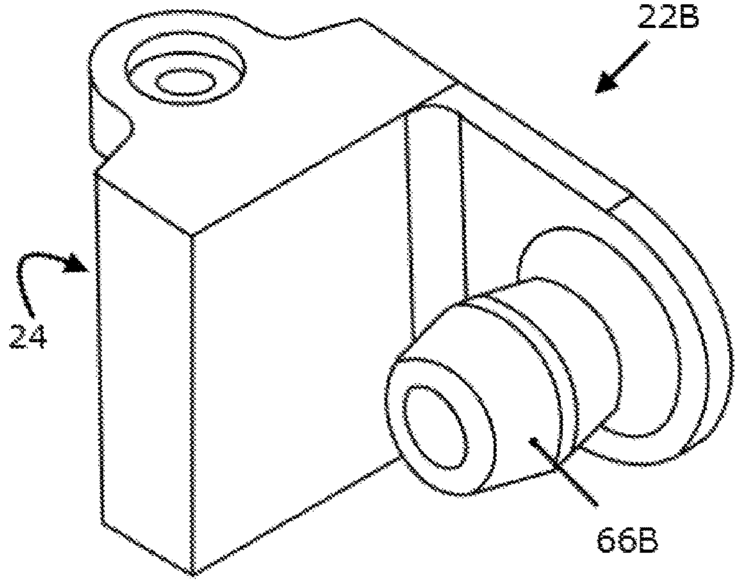
Figure 10C:
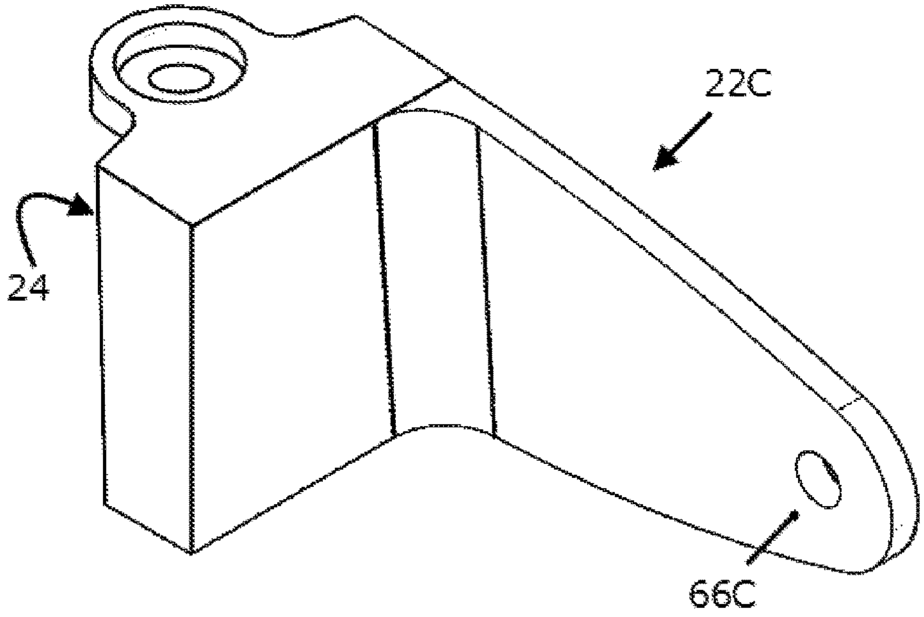

An object of at least one embodiment of the invention is to provide a means of providing a mounting base capable of receiving a range of different articles. With reference to FIGS. 10A-C, in some embodiments, the bracket adaptor 22 may comprise a means 66 to affix an article thereto. In such an embodiment, a bracket base 16 may be capable of receiving bracket adaptors 22A-C with a range of different article affixing means 66A-C but similar engaging structures 24.

Each of FIGS. 10A-C depict a different, non-limiting example of an article affixing means 66A-C. For example, FIG. 10A depicts an article affixing means 66A comprising at least one aperture, enabling an article to be affixed thereupon by at least one threaded fastener. FIG. 10B depicts an example of an article affixing means 66B comprising a roller pivot mount, enabling an article that requires the ability to rotate to be mounted thereto. Some example articles may be retractable awnings, rollers (e.g. to enable sliding movement of cargo) or a reel for, e.g., coiling up flexible thread, rope, wire, cable or chain. FIG. 10C provides a further example of an article affixing means 66C wherein there is a mounting aperture that is arranged at an angle relative to the adaptor 22C. The example bracket adaptor 22C depicted in FIG. 10C may enable mounting of an article that is able to be mounted at a range of angles—for example a mountable light source—or for mounting of an article at a different position to that afforded by the example bracket adaptor 22A depicted in FIG. 10A. The skilled person will appreciate that the scope of the present invention is not to be limited to any specific article affixing means 66A-C, and that FIGS. 10A-10C are non-limiting examples of some forms that the article affixing means 66 may take.

Figure 11:
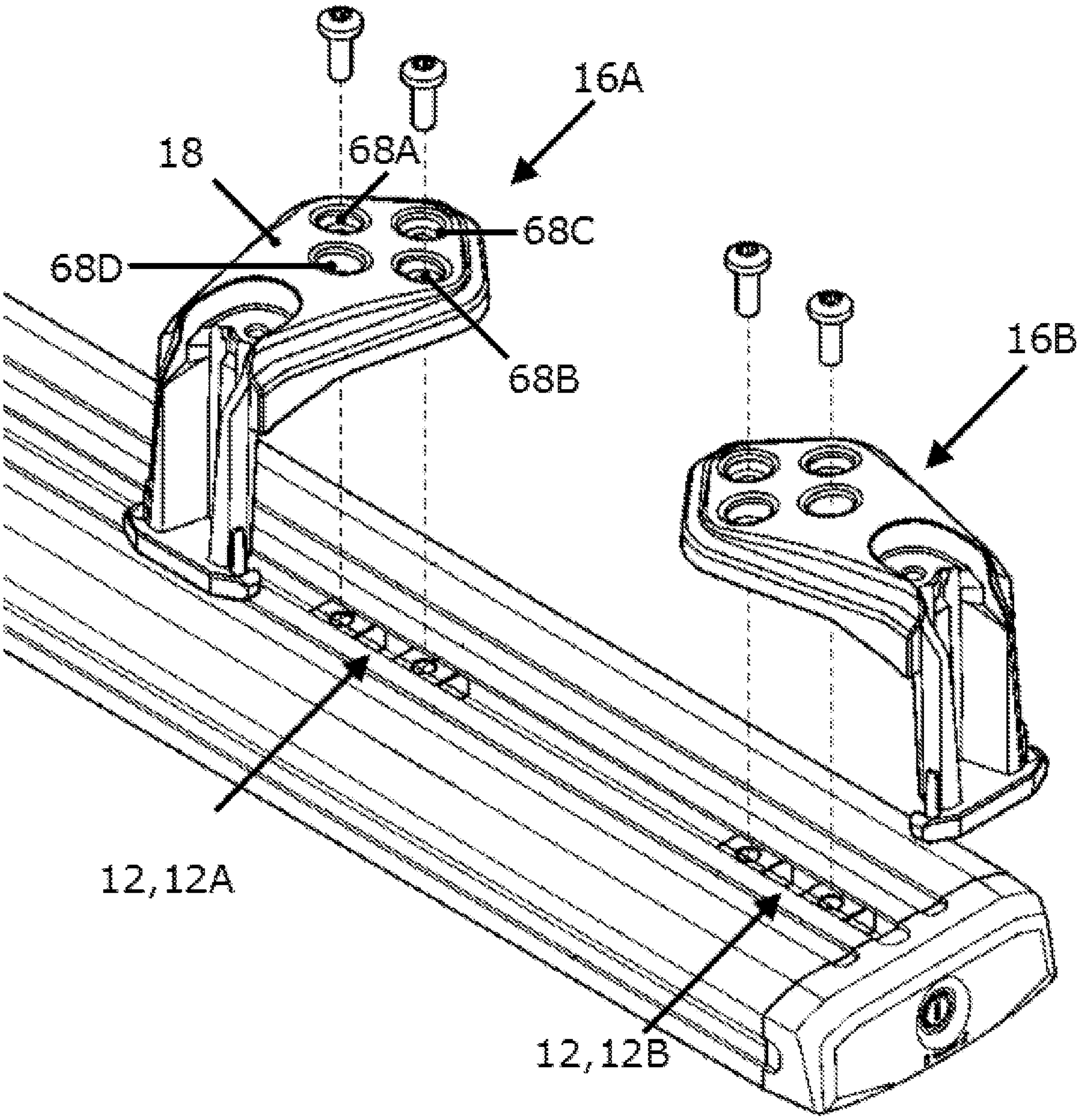
FIG. 11 depicts some possible mounting arrangements of an embodiment of the present invention.

In an embodiment and with reference to FIG. 11, the mounting structure 18 may be configured to enable the bracket base 16 to be mounted to the mounting site 14 in a plurality of orientations. FIG. 11 depicts two bracket bases 16A, 16B, each being an embodiment of the bracket base 16, being mounted to different mounting sites 12A,12B. In at least the embodiment depicted in FIG. 11, the mounting structure 18 comprises four apertures 68A-D arranged in a diamond shape, wherein the first and second apertures 68A,68B have a particular spacing, and the third and fourth apertures 68C,68D have the same particular spacing. As such, the bracket base 16 may be mounted to a mounting site comprising at least a pair of receiving apertures having the same particular spacing by extending threaded fasteners through the corresponding apertures in the mounting structure 18. The skilled person will appreciate that the embodiments depicted in FIG. 11 are exemplary only and that the mounting structure 18 may take on any of a range of forms known in the art without departing from the object of the invention.

In a further embodiment, the present invention may comprise a kit comprising a bracket base 16 of any one of the above embodiments, and at least two bracket adaptors 22 of any one or more of the above embodiments. In a further embodiment, the first bracket adaptor 22 may comprise a first article affixing means 66, and the second bracket adaptor may comprise a second article affixing means 66, each of the article affixing means 66 being adapted to affix different types of articles thereto.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

The invention claimed is:

1. A mounting bracket assembly for mounting an article to a mounting site, the assembly comprising:

a bracket base that includes at least a mounting structure that is configured to affix to the mounting site, and a receiving structure;

a bracket adaptor that includes at least an engaging structure complementary to the receiving structure of the bracket base;

wherein the mounting structure comprises four mounting apertures arranged in a diamond shape, wherein the first and second mounting apertures have a particular spacing, and the third and fourth mounting apertures have the same particular spacing; and wherein the bracket adaptor is mounted to the bracket base by being oriented in an engaging orientation relative to an orientation of the bracket base and linearly sliding the engaging structure in a first direction and into engagement with the receiving structure.

2. The mounting bracket assembly of claim 1, further comprising a first aperture extending through the bracket adaptor and a second aperture extending through the bracket base;

wherein the first and second apertures are each adapted to receive a fastener therethrough; and upon the engaging structure linearly sliding into engagement with the receiving structure, the first and second apertures align with one another.

3. The mounting bracket assembly of claim 1, wherein the receiving structure comprises at least one guiding face that is arranged to extend at an acute angle to the first direction;

the engaging structure comprises at least one complementary face that extends parallel and complementary to the at least one guiding face of the receiving structure; and upon the engaging structure linearly sliding into engagement with the receiving structure, the at least one guiding face and at least one complementary face are adjacent to and contacting one another.

4. The mounting bracket assembly of claim 3 wherein:

the receiving structure comprises a slide stop having at least one flange extending from the slide stop and arranged to form a tab slot;

the at least one guiding face is a face of the at least one flange that is adjacent to the tab slot; and the at least one complementary face is a face of a tab that is received by the tab slot.

5. The mounting bracket assembly of claim 3, wherein the receiving structure comprises a guide rail extending in the first direction for a portion of a length thereof; and the engaging structure comprises a rail-receiving portion adapted to linearly slide proximal to the guide rail.

6. The mounting bracket assembly of claim 5, wherein the at least one guiding face is an outwardly-directed face of the guide rail; and the at least one complementary face is an inwardly-directed face of the rail-receiving portion.

7. The mounting bracket assembly of claim 5, wherein:

the receiving structure further comprises a directional face extending substantially parallel to the first direction; and the engaging structure further comprises a sliding face that extends substantially parallel to the first direction when the bracket adaptor is oriented in the engaging orientation.

8. The mounting bracket assembly of claim 5, wherein the receiving structure comprises a further guide rail arranged alongside and spaced from the guide rail and extending substantially parallel thereto; and the rail-receiving portion of the engaging structure is adapted to receive and linearly slide proximal to both the guide rail and the further guide rail;

further wherein, upon the engaging structure linearly sliding into engagement with the receiving structure, a cavity is formed within the space between the guide rail and further guide rail.

9. The mounting bracket assembly of claim 5, wherein one of the guide rail and the rail-receiving portion comprises a secondary guide protrusion extending therefrom and having a length substantially parallel to the first direction; and the other of the rail-receiving portion and the guide rail comprises a secondary slot adapted to receive the secondary guide protrusion therein.

10. The mounting bracket assembly of claim 9 wherein:

the receiving structure comprises a slide stop having at least one flange extending from the slide stop and arranged to form a tab slot;

the at least one guiding face is a face of the at least one flange that is adjacent to the tab slot; and the at least one complementary face is a face of a tab that is received by the tab slot.

11. The mounting bracket assembly of claim 9, wherein:

the receiving structure further comprises a directional face extending substantially parallel to the first direction; and the engaging structure further comprises a sliding face that extends substantially parallel to the first direction when the bracket adaptor is oriented in the engaging orientation.

12. The mounting bracket assembly of claim 9, wherein the receiving structure comprises a further guide rail arranged alongside and spaced from the guide rail and extending substantially parallel thereto;

the rail-receiving portion of the engaging structure is adapted to receive and linearly slide proximal to both the guide rail and the further guide rail; and wherein, upon the engaging structure linearly sliding into engagement with the receiving structure, a cavity is formed within the space between the guide rail and further guide rail.

13. The mounting bracket assembly of claim 9, further comprising a first aperture extending through the bracket adaptor and a second aperture extending through the bracket base;

wherein the first and second apertures are each adapted to receive a fastener therethrough; and upon the engaging structure linearly sliding into engagement with the receiving structure, the first and second apertures align with one another.

14. The mounting bracket assembly of claim 9, wherein at least one outwardly-directed face of the secondary guide protrusion provides the at least one guiding face; and at least one inwardly-directed face of the secondary slot provides the at least one complementary face.

15. The mounting bracket assembly of claim 14, wherein:

the receiving structure further comprises a directional face extending substantially parallel to the first direction; and the engaging structure further comprises a sliding face that extends substantially parallel to the first direction when the bracket adaptor is oriented in the engaging orientation.

16. The mounting bracket assembly of claim 14, wherein the receiving structure comprises a further guide rail arranged alongside and spaced from the guide rail and extending substantially parallel thereto; and the rail-receiving portion of the engaging structure is adapted to receive and linearly slide proximal to both the guide rail and the further guide rail; and wherein, upon the engaging structure linearly sliding into engagement with the receiving structure, a cavity is formed within the space between the guide rail and further guide rail.

17. The mounting bracket assembly of claim 14, further comprising a first aperture extending through the bracket adaptor and a second aperture extending through the bracket base;

wherein the first and second apertures are each adapted to receive a fastener therethrough; and upon the engaging structure linearly sliding into engagement with the receiving structure, the first and second apertures align with one another.

* * * * *